United States Patent [19]
Hansen et al.

[11] 3,855,046
[45] Dec. 17, 1974

[54] PATTERN BONDED CONTINUOUS FILAMENT WEB

[75] Inventors: Paul Bernard Hansen, Neenah; Leon Benjamin Pennings, Little Chute, both of Wis.

[73] Assignee: Kimberly-Clark Corporation, Neenah, Wis.

[22] Filed: Sept. 1, 1971

[21] Appl. No.: 177,077

Related U.S. Application Data

[63] Continuation-in-part of Ser. Nos. 15,034, Feb. 27, 1970, abandoned, and Ser. No. 121,880, March 8, 1971, abandoned.

[52] U.S. Cl............... 161/150, 156/290, 156/306, 161/146
[51] Int. Cl............................................. D04h 1/04
[58] Field of Search .......... 156/62.2, 180, 181, 290, 156/306; 161/148, 150

[56] References Cited
UNITED STATES PATENTS

| | | | |
|---|---|---|---|
| 3,276,944 | 10/1966 | Levy.................................. | 161/150 |
| 3,368,934 | 2/1968 | Vosburgh........................... | 161/150 |
| 3,459,627 | 8/1969 | Vosburgh........................... | 161/148 |

FOREIGN PATENTS OR APPLICATIONS

1,245,088  2/1971  Great Britain

*Primary Examiner*—Harold Ansher
*Assistant Examiner*—James J. Bell
*Attorney, Agent, or Firm*—Wolfe, Hubbard, Leydig, Voit & Osann, Ltd.

[57] ABSTRACT

Continuous filament webs of thermoplastic polymers, such as polypropylene, are bonded to provide webs with desirable characteristics such as textile-like drape and softness, strength, abrasion resistant surfaces, and a high capacity for absorbing energy. One illustrated method of bonding the webs whereby undesirable shrink is minimized involves passing the web through a nip formed between heated rolls with one of the rolls containing a plurality of raised points on its surface. Bonding intensity is such as to stabilize the web and render the surfaces thereof abrasion resistant and such that filaments can pull free from bonded areas before fracturing when the web is subjected to strain.

20 Claims, 25 Drawing Figures

PATTERN BONDED CONTINUOUS FILAMENT WEB

RELATED APPLICATIONS

The present application is a continuation-in-part of application Ser. No. 15,034, filed on Feb. 27, 1970 and of application Ser. No. 121,880, filed Mar. 8, 1971 both of which applications are now abandoned.

BACKGROUND OF THE INVENTION

The present invention relates to fabric-like webs of continuous filaments of a thermoplastic polymer and, more particularly, to such webs wherein web bonding is accomplished in a particularly desirable manner.

Nonwoven webs comprised of a plurality of substantially continuous and randomly deposited, molecularly oriented filaments of a thermoplastic polymer are widely known. Among others, the following patents illustrate a variety of methods for preparing such webs: Kinney (U.S. Pat. No. 3,338,992 and No. 3,341,394); Levy (U.S. Pat. No. 3,276,944); Peterson (U.S. Pat. No. 3,502,538); Hartmann (U.S. Pat. No. 3,502,763 and No. 3,509,009); Dobo, et al., (U.S. Pat. No. 3,542,615); and Harmon (Canadian Pat. No. 803,714).

While many different methods are illustrated for initially preparing such continuous filament webs, the available methods generally have at least three common features. First, the methods of preparation involve continuously extruding a thermoplastic polymer (either from the melt or a solution) through a spinneret in order to form discrete filaments. Thereafter, the filaments are drawn (either mechanically or pneumatically) in order to molecularly orient the polymer filaments and achieve tenacity. Lastly, the filaments are deposited in a substantially random manner onto a carrier belt or the like to form a web with substantially isotropic physical characteristics.

Continuous filament webs can be formed in the above described general manner which are characterized by a typically fabric-like softness, hand, and drape, and thus appear to be quite suitable for many fabric applications where conventional woven fabrics or the like have been conventionally employed. However, as initially prepared, continuous filament webs are ordinarily very unstable, thus lacking adequate strength to permit their completely successful use in applications such as bed linens, garments, drapery materials, etc. Consequently, it is conventional practice to stabilize the continuous filament webs by bonding together the filaments contained therein either autogenously or by means of independently applied adhesives.

While known bonding techniques increase the stability of continuous filament webs, a problem exists in achieving such increased stability and also other desirable web characteristics such as fabric-like drape, softness and feel. Web stabilization techniques involving overall web bonding wherein the filaments in the web are united at substantially all filament cross-over points generally produce a web which is harsh and stiff. While it is true that the initial stiff and harsh feel of overall bonded webs is frequently diminished when the web is actually used, presumably due to some bond breakage, such softening is generally accompanied by other undesirable features such as a reduction in surface abrasion resistance and an overall reduction in web strength and stability.

Other known web stabilization techniques such as those which involve intermittent web bonding have not been found to be competely satisfactory. In particular, it has been difficult to obtain an intermittently bonded continuous filament web wherein the web is textile-like in drape, feel, and softness, has good surface abrasion resistance and has good strength characteristics particularly with respect to the web's capacity to absorb energy under strain. This latter characteristic of energy absorption is indicative of the ability of the web to deform without substantial filament fracture under strain. A high capacity for absorbing energy and accompanying continued load bearing ability, either with elastic or inelastic deformation, is particularly important when the web is to be used in applications such as garments and sheets where, in use, the web will be constantly subjected to strains at localized areas such as the toe area in bed sheets and the elbow and knee areas in wearing apparel. In the absence of a good capacity for absorbing energy, the use of continuous filament webs in such applications is accompanied by significant web failure at those localized regions where strains are applied.

The difficulty in obtaining desirable fabric-like webs with functionally good energy absorbing characteristics exists especially with respect to low basis weight webs and webs containing low tenacity filaments. A manner by which the energy absorption of such webs could be improved would enhance their acceptability in a variety of end use applications where it is presently necessary to employ higher basis weight webs or webs containing stronger filaments.

OBJECTS OF THE INVENTION

Accordingly, it is a principal object of the present invention to provide a stabilized nonwoven continuous filament web which is soft and drapable and, in addition, is characterized by surface abrasion resistance combined with an improved capacity to absorb energy under strain.

A more specific object resides in providing a fabric-like web with a high capacity for absorbing energy which is fashioned from fiber filaments having a low filament tenacity. A similar object resides in providing such a web at a low web basis weight.

Related to the foregoing objects, it is a further object to provide a web wherein desirable energy absorbing characteristics are achieved through autogenous filament bonding, there being no necessity for the use of independently applied adhesives or independent strengthening means.

A further object resides in providing webs having the foregoing features in a manner such that the tenacity characteristics of the web filaments are not adversely affected.

An additional object of the present invention is to provide an efficient and economical method of preparing webs possessing many of the above-mentioned characteristics wherein filament shrinkage accompanying web stabilization is minimized.

Other objects and advantages of the present invention will become apparent upon reading the following detailed description and upon reference to the drawings, in which:

While the invention will be described in connection with preferred embodiments it is to be understood that the invention is not to be limited to those embodiments. On the contrary, all alternatives, modifications, and equivalents as can be included within the scope and spirit of the invention defined in the appended claims are intended to be covered. For example, while the present invention will be described with respect to webs containing continuous polypropylene filaments, the invention is applicable to webs containing continuous filaments of other spinnable thermoplastic polymers which have identifiable crystalline melting points to permit their bonding in the manner illustrated herein. Identifiable crystalline melting points are important in order to permit the selection of appropriate bonding conditions so as to achieve a proper level of bond intensity which, as will hereinafter be discussed, is important in preparing webs with the desirable characteristics previously mentioned. In addition to polypropylene, other useful polymers include polyethylene, polyamides, and esters such as polyethylene teraphthalate as well as mixtures of thermoplastic polymers and copolymers. While the various conditions of temperature and pressure illustrated herein to effect bonding are particularly suitable for polypropylene webs, it is felt that the appropriate conditions for effecting bonding of webs of other polymers in order to obtain the desirable attributes discussed herein will be readily apparent to those skilled in the art.

SUMMARY OF THE INVENTION

Briefly stated, continuous filament nonwoven webs constructed in accordance with this invention are stabilized by an intermittent pattern of compacted, shaped areas within which the filaments are held together by autogenous bonds of a distinctive character hereinafter termed "releasable bonds." Releasable bonds, in general, are bonds of an intensity such that filaments pull free of the compacted areas without breaking when the web is subject to strain, and provide webs with a good degree of surface abrasion resistance and capacity for absorbing energy. The webs are also characterized as being strong and possessing a desirable fabric-like drape and softness.

In accordance with a further aspect of the present invention there is also provided a method of preparing stabilized continuous filament webs having a desirable fabric-like drape and softness wherein undesirable shrinkage is minimized during bonding. Webs are so prepared by preheating a restrained unbonded web and thereafter passing it through the nip of two heated rolls with at least one of the rolls having raised points on its surface.

DESCRIPTION OF PREFERRED EMBODIMENTS a. Initial Web Laydown

Figure 1:
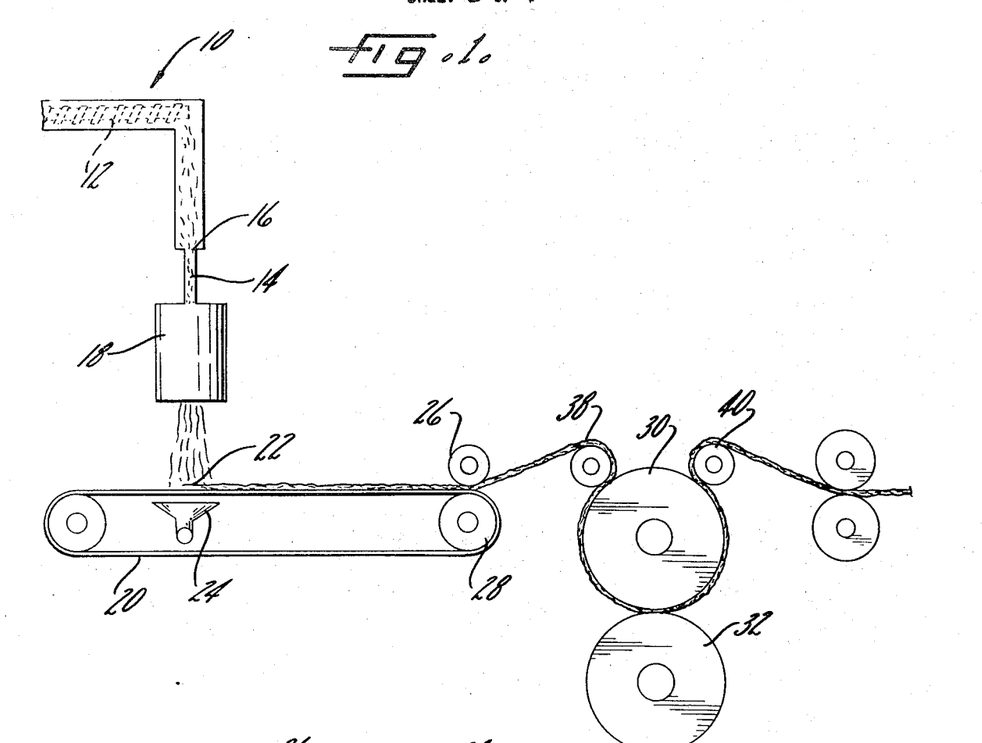
FIG. 1 is a schematic side elevation view of apparatus which can be used in preparing webs according to the present invention.

Turning to the drawings, FIG. 1 schematically illustrates one manner in which continuous filament webs of the present invention can be prepared. As shown, polymer 10 is introduced into a conventional extruder 12 and extruded in the form of filaments 14 through a spinneret 16. Drawing of the filaments is then accomplished by passing the spun filaments 14 through a take-off device 18. Thereafter, the filaments are deposited in a substantially random manner on the moving carrier 20 in the form of web 22. Suction means 24 can be present to assist in web formation on the carrier.

With respect to the broad aspects of the present invention, the manner in which the web 22 is initially prepared is not particularly important and any technique for preparing such can be used. However, a particularly useful method of web formation is described in U.S. Pat. application, Ser. No. 865,128, entitled "Continuous Filament Nonwoven Web and Process for Producing the Same," filed on Oct. 9, 1969 and now U.S. Pat. No. 3,692,618. This technique permits especially high rates of web formation. The disclosed method involves conventional spinning of continuous filaments of a synthetic polymer by, for example, extruding the polymer through a multiple number of downwardly directed spinning nozzles, preferably extending in a row or multiple number of rows. The filaments, as they are spun, are gathered into a straight row of side-by-side, evenly spaced apart, untwisted bundles each containing at least 15 and preferably from 50 up to 1,000 filaments. These filament bundles are simultaneously drawn downwardly at a velocity of at least 3,000 meters per minute, and preferably from 3,500 to 8,000 meters per minute, in individually surrounding gas columns flowing at a supersonic velocity and directed to impinge on a substantially horizontal carrier. The gathering of the filaments into the untwisted bundles and their drawing and directing to impinge on the carrier is preferably effected by passing the bundles through air guns which surround the filaments with a column or jet of air which is directed downward at supersonic velocity. The air guns are arranged so as to extend in one or more rows extending across the carrier at right angles to its direction of movement, so that the bundles confined in the gas columns at the same strike the moving carrier extend in a line or row at right angles across the carrier. In order to enhance intermingling of the bundles, they can be made to oscillate, the plane of oscillation being transverse to the direction of carrier movement. The carrier can be a conventional carrier used in a nonwoven art, such as an endless carrier or belt screen or the upper portion of a drum, as for example a screen drum.

When prepared as described above, the filament bundles, containing a number of parallel filaments, are laid down on the carrier in a loop-like arrangement with primary loops extending back and forth across the width of a section defined by the impingement of the air column from one air gun on the carrier. Before and as the parallel filament bundles impinge the carrier, they are broken up into sub-bundles containing a lesser number of parallel filaments and forming secondary smaller loops and swirls. The secondary loops and swirls overlap each other, and those of adjacent sections, to result in substantially complete intermingling with the overlapping portions of adjacent sections. Thus, the laid-down filament bundles form a continuous uniform nonwoven web.

b. General Process Aspects of Web Bonding

Referring again to FIG. 1, after formation on the carrier 20, the web 22 is lightly compacted by passage between rolls 26 and 28 to cause slight consolidation and provide sufficient integrity for further processing. Thereafter, in accordance with an important aspect of the present invention, the web is stabilized.

Generally, in order to autogenously bond a thermoplastic filament web, i.e., achieve filament bonding without the application of independently applied adhesives or solvents, the web must be heated to a temperature at which filament softening occurs. As is known, however, webs of molecularly oriented thermoplastic filaments generally exhibit considerable shrinkage at elevated temperatures. Accordingly, in order to prevent undesirable shrinkage, e.g., more than about 20%, it is customary to physically restrain the web during bonding. One prior method achieves bonding by restraining the web between extended surface while maintaining pressure on the overall web surface while it passes through a heating zone. While a securely bonded, low shrink web can be obtained in such a manner, the web is generally stiff and paper-like.

However, in accordance with one feature of the present invention, bonding of a thermoplastic filament web to achieve stabilization can be accomplished in a manner which both prevents undesirable shrinkage of the web and preserves its desirable fabric-like hand and drape. Moreover, as will be apparent, the illustrated manner of bonding can be economically accomplished at high speeds and directly "in line" with the initial web forming process.

Figure 2:
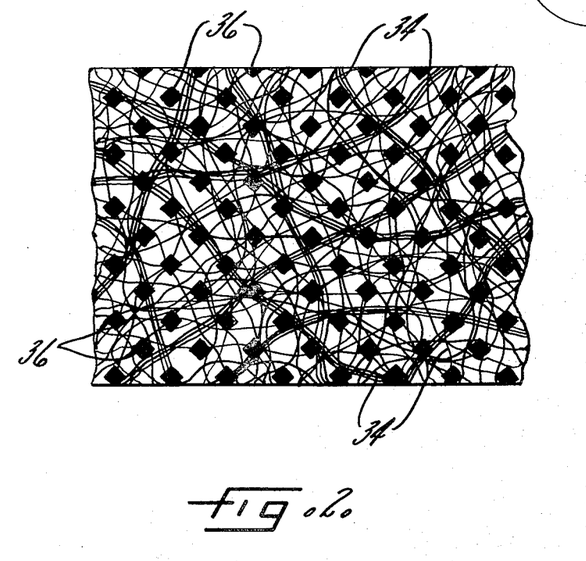
FIG. 2 is a top view of a web prepared in the manner illustrated by FIG. 1.

As is shown in FIG. 1, in accordance with one embodiment of the present invention, bonding is acccomplished by preheating the web 22 by bringing it over the idler roll 38 and forcing it into contact with the smooth surfaced, heated roll 30. Thereafter, bonding is effected by passing the preheated web through the pressure nip formed by the roll 30 and the heated roll 32 which contains a plurality of raised points on its surface. After passage through the nip, the web remains in forced contact with the roll 30 until it is removed therefrom by passage over the second idler roll 40. The bonded web comprised of continuous filaments 34 and discrete, shaped compacted areas 38 wherein the filaments have been bonded together by pressure and heat is schematically illustrated in FIG. 2.

By appropriately selecting the amount of web nip prewrap (the distance between roll 38 and the nip) and of lesser importance, the nip post wrap, the pattern of the raised points on the roll 32, the nip pressure, and the roll temperatures, strong webs with a desirable fabric-like drape and softness can be prepared without an undesirable degree of shrinkage accompanying bonding. Also, in accordance with a further feature of the present invention hereinafter discussed, the illustrated process can be employed in preparing webs which possess unexpectedly desirable strength characteristics, particularly with respect to their capacity for absorbing energy.

Turning initially to the general process aspects of the illustrated bonding operation as they relate simply to the preparation of a soft, drapable bonded web without an accompanying substantial adverse shrinkage, the fact that the web is brought into contact with the heated roll 30 prior to passage through the nip permits bonding to be quickly accomplished without substantial adverse web shrinkage. By appropriately coordinating the amount of prewrap with the roll 30 temperature and the web speed, the filaments in the web, and particularly their surfaces, can be brought to a somewhat softened state as they enter the roll 30, 32 nip. This permits bonding under moderate conditions and avoids the necessity for long nip dwell times. Moreover, as illustrated, the idler roll 38 can be positioned such that the web prewrap exceeds about 25% of the roll 30 surface. By so positioning the idler roll, the web is forced into contact with the roll 30 thereby enhancing rapid heat transfer and providing restraint on the web during preheating in order to minimize shrinkage. Web post wrap after bonding is felt to be desirable in preventing filaments from pulling free of bond areas immediately after bond formation.

The temperature of the heated rolls 30 and 32 and the nip pressure should, of course, be selected so as to effect bonding without undesirable accompanying side affects such as excessive shrinkage or web degradation. While particularly appropriate roll temperature and nip pressures are generally influenced to an extent by other parameters such as web speed, web basis weight, polymer characteristics, etc., it has been found roll temperatures around the crystalline melting point of the polymer filaments can be employed (e.g., about 275°F.–350°F. for polypropylene) in combination with nip pressures of about 3,000–50,000 psi. The important thing is that the web not attain a temperature where extensive filament melting occurs.

In order to realize the advantages of the bonding process illustrated herein, it is important to accomplish web bonding in only an intermittent manner. As illustrated in the FIG. 1 embodiment of the present invention such can be accomplished by the use of a roll 32 having a plurality of raised points of its surface. The pattern of the raised points is generally regular and is selected such that sufficient overall bonded area is present to yield a web with adequate integrity and tensile strength. However, the bonded area should not be so large as to produce a stiff web with an unattractive drape and softness. The pattern of raised points in the roll 32 should be such that the total bonded area of the web (the combined area of the individual compacted areas) is about 5–50% of the total web area. Furthermore, the number of compacted areas in the web, i.e., the bond density, is also important. To an extent, the denier of the filaments contained in the web influences the selection of an appropriate bond density with higher bond densities being useful with webs containing low denier filaments. In general, bond densities on the order of about 50–3,200 compacted areas/in.$^2$ are useful with polymer filaments having deniers of about 0.5–10. Particularly preferred webs prepared by the illustrated process are those wherein the total bonded area is about 10–25%, the bond density is about 100–500 compacted areas/in.$^2$ and the polymer filament denier is about 0.8–2.5.

c. Releasable Bonds — Their Characteristics and Preparation

As has been stated, the bonding process of the present invention, an embodiment of which has been illustrated in FIG. 1, is broadly applicable to the preparation of soft, drapable continuous filament webs wherein bonding is accomplished without an accompanying adverse shrinkage. However, in accordance with an additional and more specific feature of the present invention, it has been discovered that by controlling the intensity of the bonding conditions in a particular manner, a continuous filament web can be prepared which is not only soft and drapable but which additionally possesses certain optimum strength characteristics, particularly with respect to the web's surface abrasion resistance and by capacity for absorbing energy under strain.

In accordance with this aspect of the present invention, bonding can be accomplished in the general manner illustrated in FIG. 1. However, the bonding conditions and especially the roll temperatures and nip pressure, are particularly controlled so as to yield a web with abrasion resistant surfaces but in which, under conditions of strain, the filaments autogenously bonded within the individual intermittent compacted areas release from the areas rather than fracture. Such webs are termed "released bonded webs" and exhibit a surprisingly high capacity for absorbing energy in combination with a desirable fabric-like drape and softness. The statement that a fiber filament is released from an area means that the filament separates from an individual compacted area either alone or combined with other filaments with its identity as an individual fiber filament being preserved. While a released fiber can be distorted, e.g., flattened out over that portion where originally held within the area, it cannot be fractured and still be designated as such.

The actual bond intensity, i.e., the strength of the bond between filaments within an individual compacted area, in a web exhibiting improved energy absorption depends on the tenacity of the polymer filaments. It is presently believed that theoretically optimum bonding is achieved when, under strain, the filaments in the web release from their individual compacted areas when a load on the filament in the vicinity of a compacted area of a magnitude of just below the filament's tenacity has been developed. By behaving in this fashion, a filament carries an applied strain up to a given loading. An additional strain is applied, the filament releases from the compacted area, i.e., pulls free, and due to the curvilinear configuration of the filament in the web between the discrete compacted areas, the stress on the filament is relieved and the filament is thereafter available to carry additional strain when it is once again placed under tension. The releasable bond behavior, while probably applicable to filamentary nonwovens in general, is particularly desirable in continuous filament webs where substantially no fiber ends exist. By releasing under strain, a given continuous filament can still continue to be a functional load bearing member of the web even after the web has exhibited substantial elongation and the filament has been repeatedly released from a large number of areas where originally bonded.

In contrast, if a filament does not release under strain, filament breakage occurs when the stress developed in the filament exceeds its tenacity thus reducing the effective length over which the filament can carry an applied strain. While webs containing such "overbonded" filaments can exhibit good tensile strength, energy absorption will generally be poor since, due to the decreased effective filament length as a result of breakage, the web cannot elongate and support the strain over an extended distance. Also, over-bonding can result in filament degradation with an accompanying reduction in filament tenacity whereby the filament is weakened or broken thus reducing its load bearing capacity. In over-bonded webs, such filament degradation is particularly evident around the bond edges where the filaments enter the bond areas. On the other hand, if the filaments release from their bonded areas prematurely, i.e., before significant strain has been developed in the filaments, the energy absorption can again be low since, rather than supporting an applied strain with the web substantially intact, the web tends to "slither" apart. Also, as hereinafter discussed, such "under-bonded" webs do not generally exhibit acceptable surface abrasion resistance for many uses.

The fact that the compacted areas of the web containing the releasable bonds are distributed in a pattern which is preferably regular over the web is also believed to contribute to desirable energy absorbing and strength characteristics of the web, particularly when a pattern within that previously identified as being preferred is employed (100–500 bond density and 10–25% bond area). A pattern of compacted areas provides for significant unbonded filament spans of generally curvilinear filament lengths between the compacted areas which can align in the direction of strain. The patterned configuration and accompanying alignment serves to enhance the distribution of strain and promote the simultaneous equalization thereof over a large number of filaments throughout the web during the failure process. Since the load bearing capacity of the web depends in part on the number of filaments in the web which are effectively involved in the straining process, the distribution of an applied strain over a greater number of filaments such as results from the illustrated patterned bonding techniques is believed to be important in combination with the previously discussed bond intensity in achieving stabilized webs possessing desirable energy absorbing characteristics.

While the previous discussion has concerned the energy absorption and failure characteristics of release bonded webs under theoretically optimum bonding conditions, as a practical matter it is very difficult to achieve uniformally optimum bonding throughout a given web. One reason for this is the fact that conventionally prepared webs are rarely completely uniform in basis weight. Thus, under a given set of external bonding conditions, e.g., nip roll temperature and pressure, various portions of the web will experience different actual bonding intensities. For example, web regions of greater filament density (higher local basis weight) will be bonded more intensely than regions where filament density is less. A further factor contributing to the difficulty in achieving completely uniform bonding is the usual existence of a temperature gradient through the thickness of or across the web during bonding. Accordingly, whereas various regions of a web, or for that matter an individual bond area, may be optimally release bonded, other regions may be slightly over or under-bonded.

In spite of the difficulties in obtaining uniform bonding as above described, it has nevertheless been found that, by carefully controlling the bonding conditions, webs can be prepared with particularly desirable surface abrasion and energy absorbing characteristics. In general, webs according to the present invention which possess these desirable features comprise a plurality of substantially continuous and randomly deposited, molecularly oriented filaments of a thermoplastic polymer with the web having a multiplicity of discrete compacted areas formed of autogenous releasable filament bonds. The areas extend through a major portion of the thickness of the web and are distributed in an intermittent pattern providing unbonded filament spans therebetween which align in a direction of strain. The releasable bonds serve to hold the filaments which are on and adjacent the web surfaces for stabilizing the web and for rendering the surfaces thereof abrasion resistant. The releasable bonds have an intensity approaching but less than the breaking strength of the filaments such that the bonded filaments pull free from one another in the compacted areas before fracturing when the web is subjected to strain.

Under strain, webs according to the present invention exhibit an audible crackling or pinging sound attributable to filament release from compacted areas. In addition, the actual progressive disappearance of the compacted areas due to filament release therefrom during web strain can be visually observed.

The bonding conditions useful in preparing an appropriately release bonded web with apparatus such as illustrated in FIG. 1 can be established by preparing a number of webs under different conditions of roll temperatures and nip pressures and observing those conditions under which energy absorption is maximized. With polypropylene webs having basis weights of about 0.3–1 oz./yd.$^2$, and particularly about 0.3–0.7 oz./yd.$^2$, roll 30 temperatures of about 180°F.–325°F., particularly 240°F.–320°F., and roll 32 temperatures of about 275°F.–340°F., particularly 300°F.–330°F., are useful at web speeds of about 275–350 ft./min. Nip pressures (on raised points) of about 3,000–50,000 psi, preferably 20,000–45,000, can be employed. At higher web basis weights, e.g., 1–3 oz./yd.$^2$, it is generally desirable to maintain both heated rolls at a temperature of about 310°F–350°F. and use higher nip pressures.

The bonding method disclosed herein to prepare release bonded webs is particularly desirable as applied to webs prepared as described in the above-referred to copending application, Ser. No. 865,128 now U.S. Pat. No. 3,692,618, which have basis weights of less than about 1. oz./yd.$^2$. While high rates of web formation are therein disclosed, due to the pneumatic drawing technique only relatively low values of filament tenacity are achieved, being on the order of about 2–5.5 grams per denier and generally about 3.5–5. By releasably bonding such webs in accordance with the present invention, values of specific energy absorption (energy absorption in in.-lbs./40 in.$^2$ as measured by the Table I procedure which is divided by basis weight in oz/.yd.$^2$) in excess of about 40, and generally in excess of about 50, in at least one direction and especially in both the machine and cross-direction of the web can be obtained. To obtain such high values of energy absorption on light webs with low filament tenacities is quite unexpected. This is particularly surprising inview of the fact that such values can be obtained in combination with handle-o-meter ratings in both directions of less than about 6 grams, and generally less than about 5 grams.

Table I illustrates certain characteristics of a continuous filament polypropylene web bonded under various bonding conditions. The polypropylene web was prepared in accordance with the procedure set forth in the above-mentioned Ser. No. 865,128 and now U.S. Pat. No. 3,692,618. The web, prior to bonding, had the following characteristics:

Basis Weight (web average) = 0.5 oz./yd.$^2$
Width = 10 inches
Filament Denier = 1.62
Filament Tenacity = 4.4 grams/denier
Elongation = 142%
Crystalline Melting Point of Polymer = 162°C.

Web bonding was accomplished with apparatus similar to that shown in FIG. 1 with roll 30 being a smooth stainless steel 6 inch diameter roll with means for being heated and roll 32 being a steel roll also containing means for being heated and having a patterned configuration of raised points on its surface. The raised points on the roll 32 were about 0.04 inch high and positioned such that the bonded web contained regularly spaced compacted areas in a diamond pattern in a density of about 200/in.$^2$. Each area was a square of about 0.0285 inch on a side with a diagonal of the square positioned in the machine direction. About 17.5% of the surface area of the web was occupied by the compacted areas. Bonding was accomplished at a speed of 328 ft./min. Rolls 38 and 40 were positioned such that for all examples except 1A and 5A, 9 inches of web wrap on the roll 30 surface were present prior to the bonding nip and 8 inches after the nip. For Examples 1A and 5A only 3 inches of web wrap on the roll 30 were present prior to the bonding nip.

TABLE I

| Ex. | Roll Temp. °F. Smooth | Engraved | Nip Pressure (PSI) | $E_L$* C.D. | M.D. | ES** C.D. | M.D. | TS** C.D. | M.D. | Hand**** C.D. | M.D. | Toughness Index C.D. | M.D. |
|---|---|---|---|---|---|---|---|---|---|---|---|---|---|
| 1  | 180 | 300 | 5500  | 45 | 36 | 25.6 | 25.6 | 2.1 | 2.5 | 4 | 4.5 | 190 | 180 |
| 1A | 180 | 300 | 5500  | 44 | 33 | 20.4 | 14.9 | 1.6 | 1.6 | — | —   | 140 | 106 |
| 2  | 240 | 300 | 5500  | 34 | 31 | 18.1 | 26.6 | 2.1 | 3.2 | — | —   | 142 | 198 |
| 3  | 180 | 320 | 5500  | 41 | 35 | 23.6 | 34.5 | 2.4 | 3.8 | — | —   | 196 | 266 |
| 4  | 240 | 320 | 5500  | 33 | 31 | 15.7 | 36.8 | 2.0 | 4.4 | 3 | 6   | 132 | 272 |
| 5  | 180 | 300 | 28000 | 50 | 42 | 38.3 | 46.6 | 3.2 | 4.5 | 3 | 4   | 320 | 378 |
| 5A | 180 | 300 | 28000 | 50 | 43 | 34.2 | 51.2 | 2.2 | 4.6 | — | —   | 220 | 396 |
| 6  | 240 | 300 | 28000 | 41 | 40 | 26.7 | 55.4 | 2.7 | 5.5 | — | —   | 216 | 440 |
| 7  | 180 | 320 | 28000 | 43 | 34 | 26.1 | 32.4 | 2.5 | 3.9 | — | —   | 216 | 266 |
| 8  | 240 | 320 | 28000 | 28 | 22 | 14.2 | 16.4 | 2.1 | 2.9 | 5 | 7   | 118 | 128 |

* % Elongation to peak tensile.
** Can be obtained with a conventional Instron tensile testing machine equipped with an automatic integrator and as described in the Instron Manual Procedure No. 10-1-1c. As set forth therein, energy absorption to peak tensile is related to the integrator read out according to the following formula (Measurement being made on 8" by 8" samples folded so as to have four plies, 2" wide and 8" long with a 5" jaw span. All values referred to herein being based on such a sample size.)
ES = (I)/(5000) × L × S
ES = Energy Absorption (in. -lbs./40 in.$^2$)
I = Integrator Read Out
L = Full Scale Load (lbs.)
S = Cross Head Speed (in./min.) - 20 inches/min. for examples
*** Tensile strength was measured on a 8 by 8 inch sample folded as above-described using a 5" jaw span and an Instron machine with a cross-head speed of 20 inches/minute. Values are reported in lbs./inch. (maximum tensile divided by 8).
**** Indicates web stiffness. Reported value is the force (in grams) required to bend sample using a standard Thwing-Albert Instrument Company Handle-o-Meter.

Referring to Table I, it can be observed that energy absorption and tensile strength attain their maximum value at intermediate bonding conditions, i.e., conditions less severe than those for the comparative example where both of the roll temperatures, and pressure, and pre-warp are at a maximum. Moreover, by comparing Example 7 with the conparative Example 8, it can be seen that at high patterned roll temperatures and high pressures, the temperature of the smooth roll can significantly affect energy absorption and tensile strength. As illustrated by Examples 1 and 2 as well as 3 and 4, such is not so at low pressures. At low pressures, the temperature of the smooth roll can significantly affect energy absorption and tensile strength. As illustrated by Examples 1 and 2 as well as 3 and 4, such is not so at low pressures. At low pressures, the temperature of the patterned roll appears to be most significant in optimizing performance. Also, web pre-wrap appears to be more important at less severe bonding conditions. Thus, Table I illustrates that for a particular web, the energy absorption and tensile strength can be optimized by appropriately selecting the bonding conditions.

Referring still to Table I, it will be noted that the Toughness Index of the Example 1–8 webs is also reported. The Toughness Index is the product of the web's elongation (percent) at maximum tensile strength and maximum tensile strength (lbs./inch) which is normalized for basis weight by dividing this product by the web basis weight (oz./yd.$^2$). The Toughness Index is believed to be a reliable indication of web's capacity for absorbing energy and particularly for the webs illustrated herein which have basis weights of less than about 1 oz./yd.$^2$ and generally less than 0.7 oz./yd.$^2$. It is thought that release bonded webs prepared in accordance with the present invention will have a Toughness Index, in one direction and preferably both, of at least about 130. Webs having an especially high capacity for absorbing energy as well as other desirable characteristics will have a Toughness Index of at least 200. The indicated desirable values of Toughness Index are thought to be particularly applicable to continuous filament polypropylene webs having filament tenacities of above about 4 grams/denier.

The photographs of FIGS. 3–13 depict isolated compacted areas contained in several of the Example 1–8 webs. The photographs were obtained with a scanning electron microscope; FIGS. 3–8 being at 100 X magnification and FIGS. 9–13 being at 300 X magnification. The correspondence between the FIGS. and the Examples is presented in the following Table II:

TABLE II

Figure 3A:
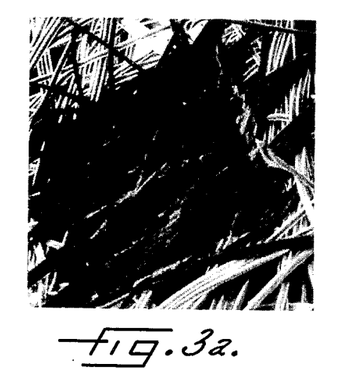
FIGS. 3–13 are greatly enlarged scanning electron micrographs of particular bond areas of webs prepared as illustrated herein.
Figure 3B:
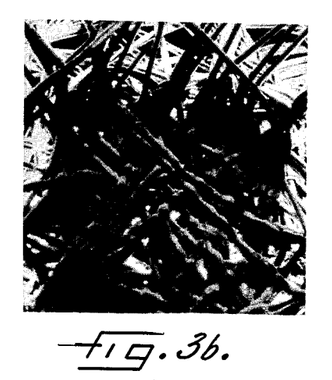
Figure 4A:
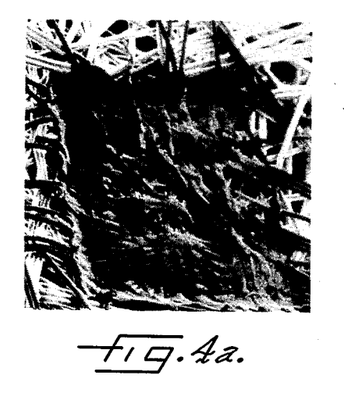
Figure 4B:
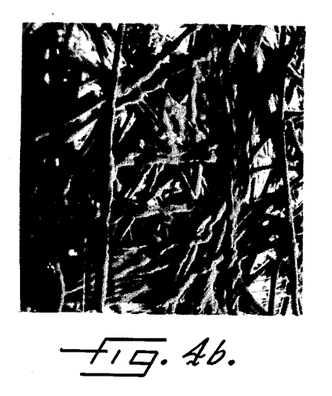
Figure 5A:
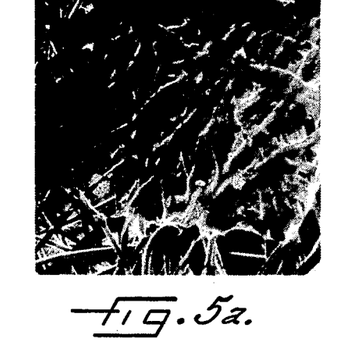
Figure 5B:
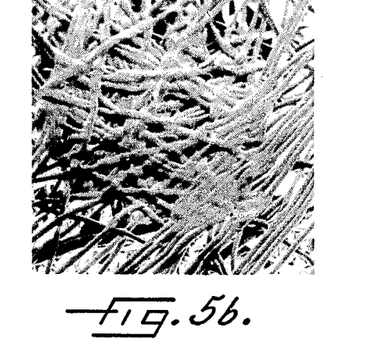
Figure 6A:
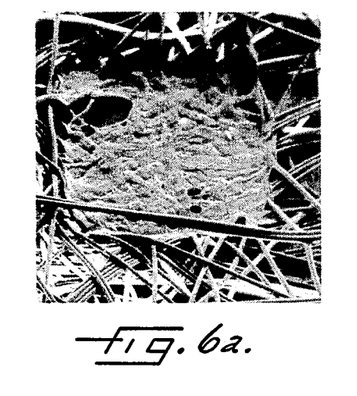
Figure 6B:
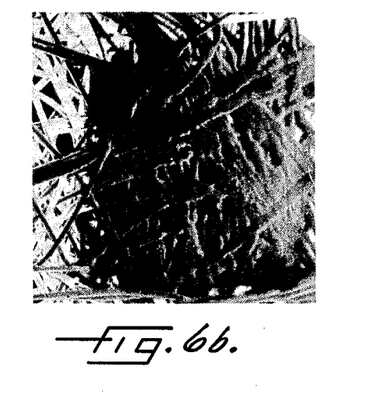
Figure 7A:
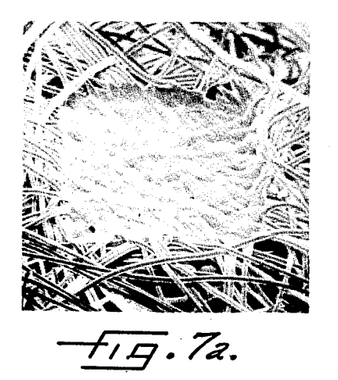
Figure 7B:
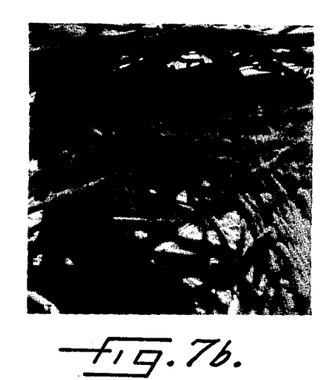
Figure 8A:
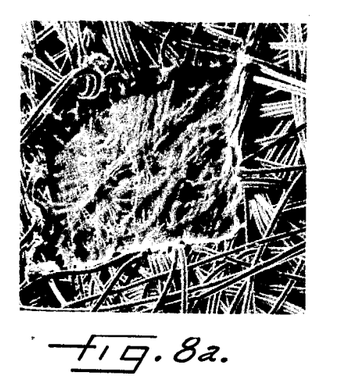
Figure 8B:
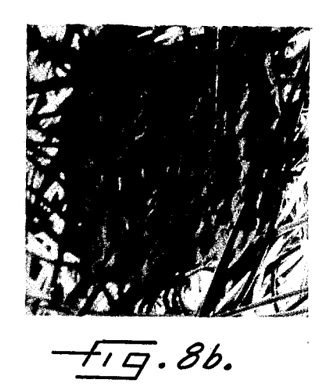
Figure 9:
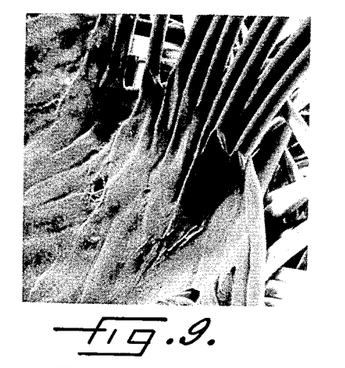
Figure 10:
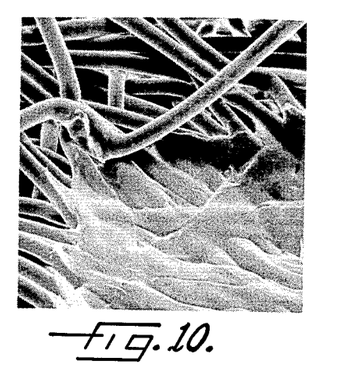
Figure 11:
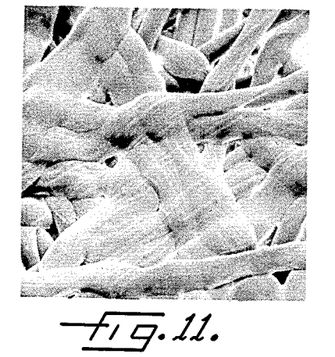
Figure 12:
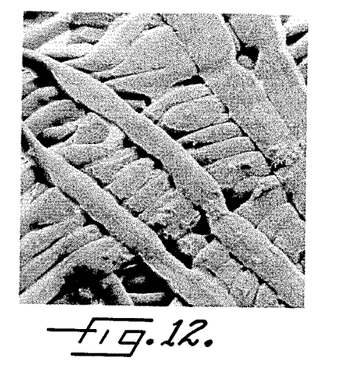
Figure 13:
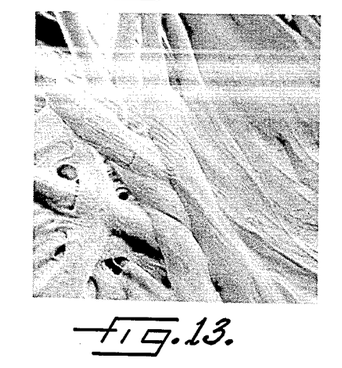
Figure 14:
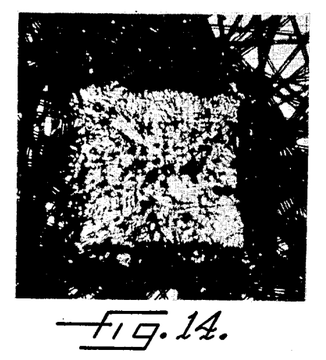
FIGS. 14–18 are greatly enlarged optical micrographs of particular bond areas of webs which illustrate various degrees of filament fusion.
Figure 15:
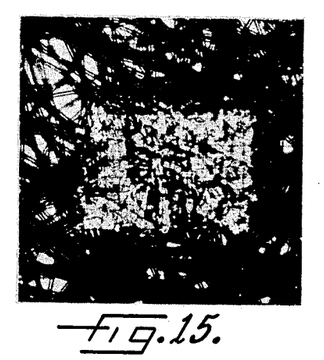

| Example | Web Side Next To Patterned Roll 32 | Web Side Next To Smooth Roll 30 |
| --- | --- | --- |
| 1 | FIG. 3(a) | FIG. 3(b) |
| 3 | FIG. 4(a) and FIG. 9 | FIG. 4(b) |
| 4 | FIG. 5(a) | FIG. 5(b) and FIG. 11 |
| 5 | FIG. 6(a) | FIG. 6(b) and FIG. 12 |
| 6 | FIG. 7(a) and FIG. 10 | FIG. 7(b) |
| 8 (Comparative) | FIG. 8(a) | FIG. 8(b) and FIG. 13 |

Referring to FIGS. 3–8, it can be seen that the surface of the compacted areas of autogenously bonded filaments of the webs prepared under the conditions given in Table I are characterized by the absence of a uniform degree of fiber bonding throughout an individual bond area. It can also be observed that a number of fiber filaments contained in the surface of a compacted area adjacent the patterned roll (i.e., the (a) figures) have lost their identity as separate fibers and give the appearance of being fused together. With the exception of the comparative Example, more of the fiber filaments on the opposite surface (i.e. the (b) figures) while being distorted appear to maintain their identity as filaments throughout the bond surface. Rather than fusing, many of the filaments in this surface appear to be cohesively secured together.

FIGS. 9–13 illustrate in greater detail the character of portions of the surfaces of compacted areas. FIGS. 9 and 13 show substantially fused areas while FIGS. 11, 12, and to some extent 13 illustrate cohesive filament bonding.

Turning now to surface abrasion resistance, the minimum acceptable level will, of course, depend on the anticipated end use application for the web. For uses such as bed linens, garments, and drapery materials abrasion resistant surfaces are important from the point of view of overall functional utility. Accordingly, since it is anticipated that the products illustrated herein will find extensive use in such applications, achieving adequate surface abrasion resistance is an important sought after product characteristic in combination with the previously discussed strength properties. While obtaining sufficient surface abrasion resistance for uses such as previously identified is related to bond intensity, it is not necessarily true that webs bonded so as to have good strength and energy absorbing characteristics will also have sufficient surface abrasion resistance. This is perhaps best illustrated in Table I where it can be seen that the web of Example 1 is bonded in a manner so as to provide a web with desirable energy absorbing characteristics compared with Example 8. Yet, the Example 1 web is only marginally useful in garment applications or the like from a surface abrasion resistance view point. Thus, where the anticipated end use requires abrasion resistant surfaces as well as desirable strength characteristics, the necessary level of bonding intensity is generally above the minimum required to simply enhance energy absorption.

Figure 19:
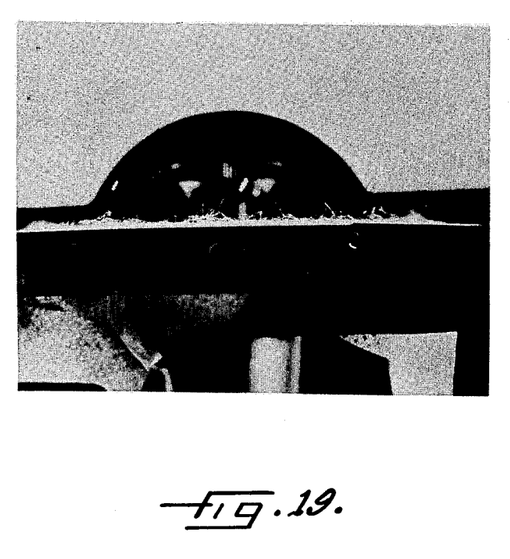
FIG. 19 is a photograph illustrating a continuous filament web, the surface of which has been subjected to a Taber abrasion test.

Abrasion measurements using the standard Taber abrasion method can be employed for indicating the surface abrasion resistance of webs illustrated herein. The results are obtained in abrasion cycles to failure. For purposes of the present invention, failure is deemed to occur at that point where a noticeable portion of the web surface subjected to abrasion in the test exhibits a fuzzy, pile-like appearance primaily due to web filaments being pulledout of compacted areas although some filament breakage may also occur. As so determined, the failure point occurs prior to filament pilling on the web surface. FIG. 19 illustrates the surface characteristics of a representative web at failure taken at about 1.2 X magnification.

Abrasion measurements are made using a Taber Standard Abrader (Model 140 PT) with a rubber calibrase No. S-32 wheel on the right abrading head and a 125 gram counter weight (total load of 125 grams). Webs useful in end use applications such as previously identified have a Taber abrasion resistance to failure as set forth above of at least about 3 cycles and preferably at least about 10 cycles. Taber abrasion measurements made on the Example 1A and Example 5 webs of Table 1 where as follows (measurements made on web side in contact with patterned roll):

Example 1A —3 cycles to failure (range of 2 to 4 for 10 samples)

Example 5 — 20 cycles to failure (range of 18 to 23 for 10 samples)

d. Additional Characteristics of Releasable Bonds and Release Bonded Webs

As previously indicated, webs can be prepared in the manner illustrated herein which are characterized by abrasion resistant surfaces and an improved capacity to absorb energy under strain. While abrasion resistance and the presence of releasable bonds within compacted areas can be directly established by abrasion measurements and comparative testing for energy absorption with webs bonded under different intensities, and the web audible and visual strain failure characteristics, it is also believed that the existence of these desirable characteristics is reflected by the visual appearance of the compacted areas contained in a web, the manner in which a web tears, and a web's elongation at maximum tensile strength. In this respect, it has been noted that an "under-bonded web" i.e., particularly a web with poor surface abrasion resistance, is generally characterized by a compacted area appearance which shows only a very small amount of filament fusion when viewed with an optical microscope. This technique for determining "under-bondedness" is believed to be useful with webs prepared in a manner wherein variations in web basis weight throughout the web and bonding intensity are present. A theoretically optimally bonded completely uniform web would more than likely exhibit no readily identifiable regions of filament fusion within compacted areas, and, thus, the technique hereinafter described would not be particularly suitable. However, as previously discussed, such optimum bonding is for practical purposes not presently obtainable with available web lay down techniques and mechanical bonding apparatus such as depicted in FIG. 1. Thus, the method presented below for determing "under-bondedness" is believed to be applicable to webs prepared as illustrated herein.

An "over-bonded" web is characterized by poor trapezoidal tear strength and is similar in tear to a perforated piece of paper. While possessing good tear strength is a desirable strength characteristic itself, it has also been found that with respect to the presently illustrated webs, the measurement of tear strength can be used to indicate web over-bonding which adversely affects energy absorption. In addition, over-bonding is evidenced by a reduced web elongation to maximum tensile strength. A more detailed manner of using the above-discussed visual, tear, and elongation techniques follows:

As indicated above, one technique for determining that a web is "under-bonded" is based on the amount of noticeable filament fusion in the compacted areas. A web wherein the surfaces of a large number of the compacted areas are seen to have only a small amount of fusion between filaments will generally not have very good surface abrasion resistance. A parameter has been developed for the purpose of determining web "under-bondedness" and this parameter is termed the "unfused bond area coefficient" and referred to hereinafter as simply as the "ubac." The ubac is a measure of the absence of filament fusion in the surfaces of the compacted areas and, as set forth previously, is applicable with respect to webs wherein basis weight and bonding intensity variations are present. A web with a high ubac has poor surface abrasion resistance and visually exhibits a large number of compacted areas with only a small amount of noticeable filament fusion. The ubac for a given web is determined by randomly cutting 10 one inch square samples from a web and thereafter allocating each of the compacted areas in each of the ten samples to one of the following three categories: (1) 0–33% fusion in the compacted area; (2) 33–66% fusion in the compacted area; (3) 66–100% fusion in the compacted area. The percent fusion in a given compacted area is determined by observing the compacted area at 100x magnification under a stereo-microscope with a grid having 10 equal area portions placed over the area. The fused portion of a particular compacted area is that portion wherein the presence of individual filaments cannot be identified as such. The unfused bond area coefficient is that percentage of the total number of compacted areas which are categorized as 0–33% fused.

Figure 16:
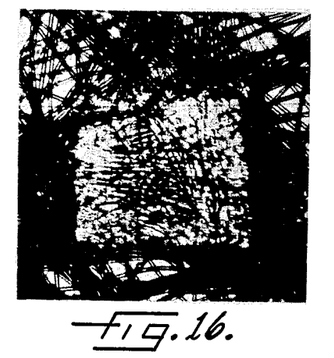
Figure 17:
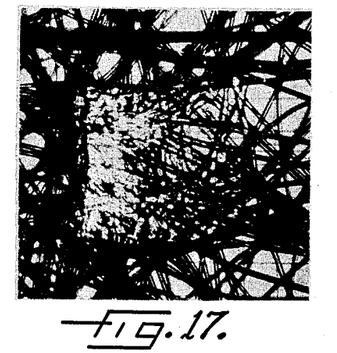
Figure 18:
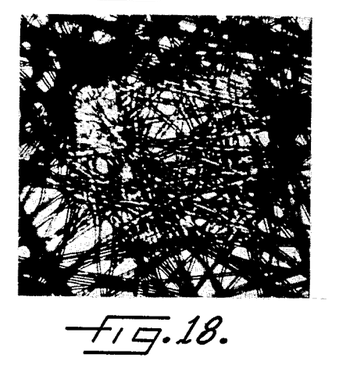

FIGS. 14–18 illustrate five individual compacted areas with varying percentages of fused area. The photographs illustrated in these figures were taken at 100x magnification using a stereomicroscope. The compacted area illustrated in FIG. 14 has a very high degree of filament fusion as evidenced by the fact that it is very difficult to follow a filament continuously throughout the compacted area. This bond is at least about 90% fused and, accordingly, would be placed in the 66–100% fusion category. Similarly, the compacted area shown in FIG. 15 would also be placed in the 66–100% fusion category. While the center of the area appears to be unfused, the remainder of the area, e.g., about 70–75%, is fused, FIG. 16 illustrates a compacted area exhibiting about 50% fusion and thus this area would be categorized as 33–66% fused. FIGS. 17 and 18 are presented to illustrate compacted areas which are properly categorized as only 0–33% fused. As is evident, the filaments in a predominant portion of these areas are readily identifiable as individual filaments. About 25% of the FIG. 17 compacted area is fused while only 10% of FIG. 18 area is fused.

As illustrated in Table III, it is believed that the unfused bond area coefficient is a good indication of whether sufficiently intense web bonding has been achieved to provide good surface abrasion resistance (it should be understood that the ubac is only indicative of "under-bondedness" and does not indicate "over-bondeness"). As illustrated in Table III, the web bonded under the previously given Example 1A conditions has the highest ubac. While this web has acceptable surface abrasion resistance and energy absorption, it is believed that webs with higher coefficients, e.g., a ubac of greater than about 65%, would not be especially desirable. As illustrated by Examples 5 and 5A, webs having a ubac of less than about 60% are especially preferred. In particular, the webs of these examples, and especially the web of Example 5, possess very desirable surface abrasion resistance. Thus, useful webs from the point of view of achieving a minimum acceptable bond intensity have a ubac of less than about 65% and, preferably, less than about 60%.

The use of the unfused bond area coefficient in identifying a web with a minimum acceptable bond intensity is especially applicable with repect to webs having a basis weight of less than about 1oz./yd.$^2$. With such "low" basis weight webs, measurements of the ubac are substantially the same for a given web on either of its sides. With higher basis weight webs, e.g., about 1–3 oz./yd.$^2$, the ubac may be different on each surface. Where it is important that both surfaces of the web be abrasion resistant, the unfused bond area coefficient on each surface should be less than about 65%.

Turning now to the use of a web's tear characteristics as an indication of "over-bonding," Table III illustrates the trapezoidal tear strength characteristics of the Example 1A, 5 5A and 8 webs. Tear strength was measured in accordance with the procedure described in ASTMD-2263 with the initial cut being made in the cross-machine direction of the web. As shown, maximum tear load and, with respect to Examples 5 and 5A, tear energy go up as bonding becomes more intense. However, as illustrated by the tear behavior of the comparative Example 8 web, over-bonding results in a significant decrease in tear load and energy. Webs wherein the bonding intensity is near optimum exhibit tear characteristics within about 50%, and preferably about 25%, of the maximum obtainable tear characteristics for that web. The trapezoidal tear test is straight forward and believed to be sensitive to web over-bonding.

Values of the specific tear strength and tear energy are also presented in Table III. These specific tear values are obtained by dividing the absolute values by the web basis weight (gms./m.$^2$) and thus represent basis weight normalized tear characteristics. Thus, the specific tear values are independent of web basis weight and should, accordingly, be principally dependent only on the tenacity of the web filaments and the intensity of the bonding conditions. Referring to the specific tear energies reported in Table III, it can be seen that release bonded webs having a basis weight of about 0.5 oz./yd.$^2$ prepared as illustrated herein from polypropylene filaments havng a tenacity of about 4.4 grams/denier are characterized by a specific trapezoidal tear energy of above about 7.8 whereas the "over-bonded" web of Example 8 has a markedly reduced specific tear energy of only about 2.8. Moreover, being normalized for basis weight, it is believed that so long as filaments with similar tenacities are employed the specific tear values observed for these webs will also be characteristic of webs with higher or lower basis weights. Such is believed to be particularly true with respect to low basis weight webs, e.g., those having a basis weight of less than about 1oz./yd.$^2$, where web bonding in the manner illustrated with respect to FIG. 1 can be easily accomplished to achieve an appropriate filament bonding intensity substantially through the thickness of the web in the compacted areas.

The effect of filament tenacity on specific tear characteristics is direct with higher specific characteristics being associated with webs similarly bonded containing higher tenacity filaments. However, by releasable bonding webs in the manner illustrated here in it is possible to achieve specific tear characteristics and accordingly energy absorbing capacities with webs fashioned from low tenacity filaments which are comparable to values believed to be obtainable only with webs prepared from higher tenacity filaments. In general, release bonded webs prepared in accordance with the present invention with filaments having a tenacity of about 2–7 grams/denier will have specific trapezoidal tear energy values of about $5 \times 10^6 - 15 \times 10^6$ cm$^3$ with higher specific tear energies being associated with webs containing higher tenacity filaments.

As indicated previously, it is also believed that a web's elongation characteristics under strain can be used as indicia of appropriate bonding intensity particularly as such concerns web "over-bonding." Release bonded webs prepared in the manner described herein and as illuatrated in Table I exhibit an elongation in both machine and cross-directions at maximum tensile strength of at least 25% and, generally, at least 30%.

TABLE III

| | | Trapezoidal Tear Characteristics* | | | |
|---|---|---|---|---|---|
| Example | Unfused Bond Area Coefficient | Maximum Load (gms) | Energy to Failure(cm-Kg) | Specific Load ($10^6$cm$^2$) | Specific Energy ($10^6$cm$^3$) |
| 1A | 63 | 1550 | 14.5 | .91 | 8.55 |
| 5 | 20 | 2450 | 13.1 | 1.52 | 8.70 |
| 5A | 55 | 2290 | 11.7 | 1.63 | 7.81 |
| 8 | 35 | 1160 | 4.22 | 0.78 | 2.81 |

* For tear characteristics, samples had following basis weights: Ex. 1A–17 gms./m$^2$; Exa. 5, 5A, and 8–15 gms./m$^2$.

f. Illustrative Uses of Release Bonded Webs

Continuous filament webs prepared according to the present invention have a very wide utility. Heavier basis weight webs, e.g., those having a basis weight of about 1–3 oz./yd.$^2$ or higher, would be quite useful by themselves as garment materials, linens, etc. In addition to the desirable characteristics previously mentioned such as drape, softness, abrasion resistance, strength, and energy absorption, the webs are also quite breathable and exhibit a degree of fluid repellency. While the degree of fluid repellency is probably not so great that the webs are suitable without additional treatment as rubber raincoat substitutes, their fluid repellent characteristics in combination with their breathability make them suitable for use in applications such as laboratory jackets where moderate fluid splashing and spills are frequently present. In particular, webs prepared in accordance with the present invention having a basis weight of about 1.5oz./yd.$^2$ – 2.5oz./yd.$^2$ would have a particularly desirable combination of breathability and water repellency which make them especially suitable for garment applications where moderate exposure to fluids is anticipated.

With repsect to the low basis weight web, e.g., 0.3oz./yd.$^2$ – 1oz./yd.$^2$, many uses are also available which take advantage of their aforementioned desirable characteristics. As disclosed in copending Bernardin application, Ser. No. 15,164, such webs are outstanding as wraps for sanitary napkins particularly when the webs are prepared from polypropylene. The highly hydrophobic character of the webs in combination with the intermittent bond pattern permits the ready passage of fluids under normal body pressures through the web to the inner absorbent core of the napkin while providing a substantially dry surface to the wearer. The fact that the surface of the webs are abrasion resistant and that the webs possess a good capacity for absorbing energy also contributes to their overall outstanding suitability for use as sanitary napkin covers.

As disclosed incopending applications, Ser. No. 15,033, (now abandoned and replaced by continuation-in-part application Ser. No. 240,754, filed Apr. 3, 1972) Ser. No. 14,930 (now abandoned and replaced by continuation-in-part application Ser. No. 247,962, filed Apr. 27, 1972), and Ser. No. 14,943 (now abandoned and replaced by continuation-in-part application Ser. No. 177,078, filed Sept. 1, 1971), laminates prepared with the low basis weight continuous filament webs illustrated herein are also quite useful. For example, laminates of continuous filament webs and one or more plies of tissue having a basis weight of about 5–15 lbs./2880 ft.$^2$ can be used in garment or wipe applications. The tissue constituent aids in imparting a functional opaque appearance to the laminate and in increasing its absorbency while the continuous filament web contributes desirable strength characteristics. Particularly desirable laminates for use as garments are prepared by placing an inner tissue ply between outer plies of continuous filament webs. The resultant product is characterized by very good wrinkle recovery, good surface abrasion resistance, a pleasing appearance and feel, and good strength. Generally, in order to preserve the desirable fabric-like drap and softness of the laminate. The respective plies are secured together by means of a spaced pattern of adhesives which typically occupies not more than about 25% of the total surface area of the laminate.

Laminates containing a ply of the nonwoven continuous filament web of the present invention are also quite useful in hospital related applications described in Krebs application, Ser. No. 90,680 now abandoned. For example, a three-ply laminate containing, as outer plies, a continuous filament web and a fluid impervious breathable web and, as an inner ply, a web of absorbent material can be used as a burn care bandage or a surgical drape sheet. When used as a bandage, the continuous filament web surface of the laminate is placed directly in contact with the burn. While the web permits transfer of burn fluids therethrough to the inner absorbent material, sticking of the bandage to the burn surface is avoided due to the hydrophobic nature of the web. Having an outer surface from the burn area which is substantially impervious to fluid and bacteria penetration helps in avoiding contamination of the burned area while the overall breathability of the laminate aids the healing process.

For use as a surgical drape sheet, and particularly in the fenestration area thereof, the laminate is positioned on the patient with the continous filament web surface away from the patient's body. The normal pressures present during an operation force any blood or other fluids which accumulate on the top surface of the sheet through the continuous filament web and into the absorbent inner ply, thus preventing fluid runoff onto the floors of the operating room and the wearing apparel of the operating personnel. However, again due to the hydrophobic nature of the continuous filament web, the outer surface of the drape sheet remains substantially dry. In preparing laminates such as described for hospital related uses, the continuous filament web typically can have a basis weight of about 0.3–1oz./yd.$^2$. The fluid impervious breathable material can be a reinforced tissue having a basis weight of about 1–2.5oz./yd.$^2$ which has been suitably treated with a fluid repellent. The inner absorbent material can also be tissue or wood pulp wadding having a basis weight of about 0.5–2.5oz./yd.$^2$.

We claim:

1. A soft, drapable nonwoven web consisting essentially of a plurality of substantially identically prepared continuous and randomly deposited, molecularly oriented filaments of a thermoplastic polymer, said web having a multiplicity of discrete, compacted areas of autogenous releasable filament bonds extending through a major portion of the thickness of the web, said compacted areas being distributed in an intermittent regular pattern providing unbonded filament spans therebetween which align in a direction of strain to enhance strain distribution throughout the web, said releasable filament bonds serving to hold the filaments which are on, and adjacent to, the web surfaces for stabilizing the web and for rendering the surfaces thereof abrasion resistant and said releasable bonds having an intensity approaching but less than the breaking strength of the filaments such that the bonded filaments pull free from one another before fracturing when the web is subjected to strain.

2. The web of claim 1 wherein the thermoplastic polymer is polypropylene.

3. The web of claim 2 wherein the compacted areas are present in a density of about 100–500 per square inch and occupy 10–25% of the web area.

4. The web of claim 3 having a basis weight of about 0.3–1 oz./yd.$^2$ and a filament denier of about 0.8–2.5.

5. The web of claim 4 wherein the polypropylene filaments have a tenacity of about 2–5.5 grams/denier and the web and has a specific energy absorption in at least one direction of at least about 40.

6. The web of claim 4 having a basis weight of about 0.3–0.7 oz./yd.$^2$ wherein the polypropylene filaments have a tenacity of about 3.5–4.5 grams/denier and the web has a specific energy absorption in both machine and cross directions of at least about 50.

7. The web of claim 4 wherein the polypropylene filaments have a tenacity of at least about 4 grams/denier and wherein the web has a toughness index in at least one direction of at least about 130.

8. The web of claim 4 wherein the polypropylene filaments have a tenacity of at least about 4 grams/denier and wherein the web has a toughness index in both machine and cross directions of at least about 200.

9. A web consisting essentially of substantially identically prepared continuous and randomly deposited, molecularly oriented filaments of a thermoplastic polymer having spaced, releasable autogenous bonds, the spacing of the bonds and the releasable character thereof providing a soft drapable web with a continued load bearing capacity under strain without filament fracture, said bonds being within intermittent regularly patterned compacted areas distributed throughout the filaments and formed by heat and pressure, the web being further characterized by the visual disappearance of the compacted areas due to filament release thereform upon application of strain to the web.

10. The web of claim 9 wherein the thermoplastic polymer is polypropylene.

11. The web of claim 10 wherein the compacted areas are present in a density of about 100–500 per square inch and occupy 10–25% of the web area.

12. The web of claim 11 having a basis weight of about 0.3–1 oz./yd.$^2$ and a filament denier of about 0.8–2.5.

13. The web of claim 12 having an unfused bond area coefficient of less than about 60%.

14. The web of claim 12 wherein the surfaces thereof have a Taber abrasion resistance of at least about 10 cycles.

15. A soft, drapable nonwoven web consisting essentially of a plurality of substantially identically prepared continuous and randomly deposited, molecularly oriented filaments of polypropylene, said web having a multiplicity of discrete areas of autogenous filament bonds, said areas being distributed in an intermittent regular pattern with a density of between about 100–500/in.$^2$ and occupying an area of between about 5–25% of the web area, said autogenous filament bonds wihtin said areas having an intensity sufficient to stabilize the web and render the surfaces thereof abrasion resistant so that the web has an unfused bond area coefficient of less than about 60% and yielding a web with trapezoidal tear characteristics within 50% of those maximally obtainable for said web and an elongation of at least 25% at maximum tensile strength.

16. The web of claim 15 having a basis weight of about 0.3–1 03./yd.$^2$ and a filament denier of about 0.8–2.5.

17. A soft, drapable nonwoven web consisting essentially of a plurality of substantially identically prepared continuous and randomly deposited, molecularly oriented filaments of a thermoplastic polymer having a tenacity of about 2–7 grams/denier, said web having a multiplicity of discrete areas of autogenous filament bonds, said areas being distributed in an intermittent regular pattern so as to be present in a density of about 100–500/in.$^2$ and to occupy an area of about 5–25% of the web area, said autogenous filament bonds within said areas being of an intensity sufficient to stabilize the web and render the surfaces thereof abrasion resistant and to yield a web with a specific trapezoidal tear energy of about $5 \times 10^6 - 15 \times 10^6$ CM$^3$.

18. The web of claim 17 wherein the thermoplastic polymer is polypropylene.

19. The web of claim 18 wherein the compacted areas are present in a density of about 100–500 per square inch and occupy 10–25% of the web area.

20. The web of claim 19 wherein the surfaces thereof have a Taber abrasion resistance of at least about 10 cycles.

* * * * *

UNITED STATES PATENT OFFICE
CERTIFICATE OF CORRECTION

Patent No. 3,855,046     Dated   December 17, 1974

Inventor(s)   Paul B. Hansen and Leon B. Pennings

It is certified that error appears in the above-identified patent and that said Letters Patent are hereby corrected as shown below:

In the Claims:

Claim 16, line 2, change "0.3-1 03./yd.$^2$" to --0.3 - 1/yd.$^2$--.

Signed and Sealed this ninth Day of September 1975

[SEAL]

Attest:

RUTH C. MASON
*Attesting Officer*

C. MARSHALL DANN
*Commissioner of Patents and Trademarks*